US006681315B1

(12) United States Patent
Hilts et al.

(10) Patent No.: US 6,681,315 B1
(45) Date of Patent: Jan. 20, 2004

(54) METHOD AND APPARATUS FOR BIT VECTOR ARRAY

(75) Inventors: Paul John Hilts, Durham, NC (US); Brian Alan Youngman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/980,070

(22) Filed: Nov. 26, 1997

(51) Int. Cl.[7] .................. G06F 15/00; G06F 15/76; H04B 1/66
(52) U.S. Cl. ............. 712/4; 712/7; 375/240.16
(58) Field of Search ............. 725/121, 111; 712/2, 3, 4, 5, 6, 7, 8; 375/240.16, 240.22; G06F 15/00, 15/76; H04B 1/61

(56) References Cited

U.S. PATENT DOCUMENTS

| 4,641,275 A | * | 2/1987 | Hatakeyama et al. |
| 4,667,300 A | * | 5/1987 | Guilfoyle ............. 708/191 |
| 4,745,547 A | * | 5/1988 | Bickholz et al. ........... 712/4 |
| 4,761,754 A | * | 8/1988 | Kinoshita ............. 708/603 |
| 5,226,079 A | | 7/1993 | Holloway ............. 380/25 |
| 5,353,285 A | | 10/1994 | Van Der Plas et al. ....... 370/84 |
| 5,365,514 A | | 11/1994 | Hershey et al. ........... 370/17 |
| 5,384,777 A | | 1/1995 | Ahmadi et al. .......... 370/85.2 |
| 5,406,504 A | * | 4/1995 | Denisco et al. .......... 702/117 |
| 5,541,921 A | | 7/1996 | Swenson et al. ............ 370/68 |
| 5,568,485 A | | 10/1996 | Chaisemartin ........... 370/85.6 |
| 5,572,517 A | | 11/1996 | Safadi ................. 370/50 |
| 5,623,650 A | * | 4/1997 | Beard et al. ............. 712/235 |
| 5,801,975 A | * | 9/1998 | Thayer et al. ........... 708/402 |

FOREIGN PATENT DOCUMENTS

WO   WO 96/34485   10/1996

OTHER PUBLICATIONS

"Dynamic Communication Key Accumulated from Previous Message Content," *IBM Technical Disclosure Bulletin*, vol. 25, No. 1, Jun. 1982, pp. 279.

"MLAP: A MAC Level Access Protocol for the HFC 802.14 Network," *IEEE Communications Magazine*, Mar. 1996, pp. 114–121.

\* cited by examiner

*Primary Examiner*—Vivek Srivastava
(74) *Attorney, Agent, or Firm*—Joscelyn G. Cockburn; Carlos Munoz-Bustamante

(57) ABSTRACT

A bit vector array apparatus provides a high speed method for processing network transmission controls. Complex data structures for controlling network access are represented in the simplest possible form as single bit vector elements. The bit vector elements are combined into bit vectors comprised of 32 single bit vector elements. The bit vectors are processed in parallel in the bit vector array apparatus, which is comprised of special-purpose bit manipulation functions to expedite the processing.

23 Claims, 8 Drawing Sheets

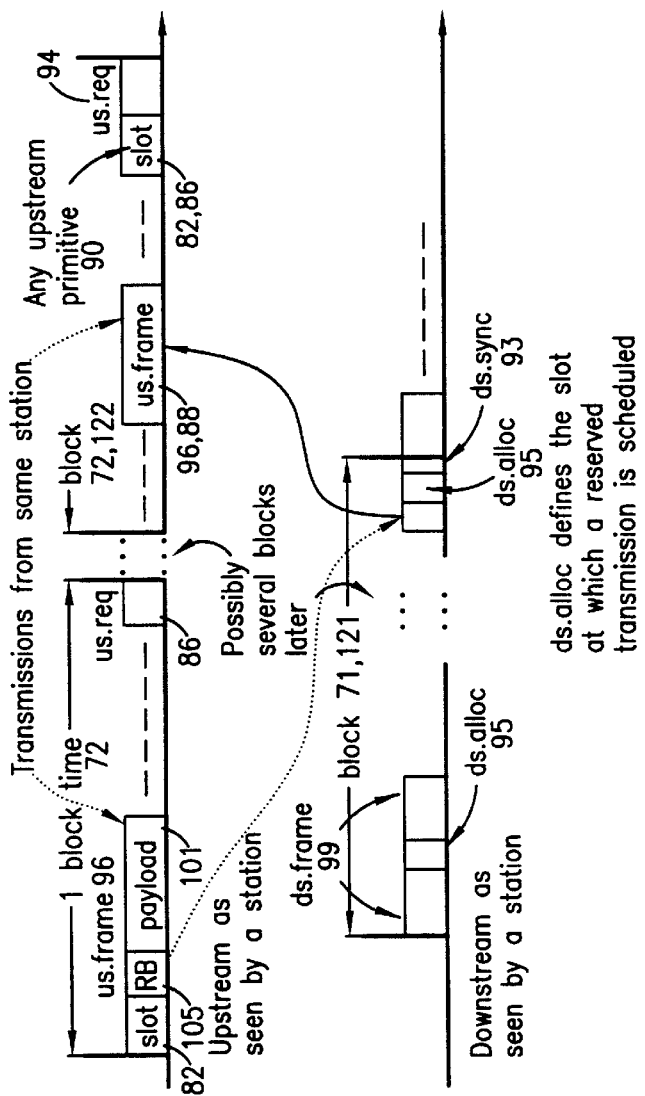

METHOD AND APPARATUS FOR BIT VECTOR ARRAY

FIELD OF THE INVENTION

The present invention relates to the bi-directional transport of digital data between a digital network and devices in customer premises, either residence or business. More specifically, the present invention relates to the management of concurrent accesses to the cable TV digital network by multiple devices so that the devices can share the data transport medium, which is a mixture of optical fiber and coaxial cable media.

BACKGROUND OF THE INVENTION

Background Art

Interactive residential broadband/multimedia services are expected to be the next main event in the cyberspace experience. Services like video on demand (where people will choose movies to their liking to watch at any time they choose), effective telecommuting (by bringing the full power of one's familiar office computer interface to one's home), remote learning, teleshopping, ever-increasing on-line newsgroup interactions, Web surfing, remote video game playing, and so on are waiting to jump into people's homes as soon as the 28.8 kb/s barrier of today's fastest modems is toppled tenfold or by a new breed of communication technologies.

The large excess bandwidth (well over 300 MHZ) available in today's cable TV (CATV) hybrid fiber/coaxial (HFC) plants is an ideal candidate to provide the underlying communications infrastructure for interactive digital services to the home. Cable operations that have not yet upgraded their all-coaxial plants to HFC are quickly moving in this direction.

In order to maintain compatibility with today's analog TV channels, the spectrum (of an HFC CATV plant) between 54 MHZ and 450 MHZ will not be affected by the new services. The spectrum between 5 MHZ and 42 MHZ will be used for "upstream" transmissions (i.e., from the home to the CATV headend station) and from there to the rest of the world, while the spectrum between 450 MHZ and 750 MHZ will be used for "downstream" transmissions (from the CATV headend station to the home). Since the theoretical frequency bandwidth of the cable is on the order of 1 GHZ, future generations of this technology may have a different split and different frequency ranges between upstream and downstream transmissions.

To cope better with power limitations, cost, channel error characteristics, system management, and so forth, the downstream and upstream spectra will be further subdivided into a number of channels, for example, 1–2 MHZ wide for each upstream channel, and about 6 MHZ wide for each downstream channel. Each of these channels, using appropriate modulation techniques, will be capable of carrying possibly from 2 to 10 Mb/s (or more) of digital data upstream (shared by up to a few thousand stations) and 30–40 Mb/s (or more) downstream (a broadcast channel).

Due to the "peculiarities" of the CATV tree-and-branch topology (e.g., the splitting of the receive and transmit frequencies), the various stations cannot directly listen to the upstream transmissions from other stations; hence, they are incapable of detecting collisions and ultimately coordinating their transmissions all by themselves. On the other hand, since the headend station is the focal point of the tree-and-branch topology, it can play a major role in coordinating the access to the upstream channel. In addition to coordinating upstream transmissions, since the downstream channels are broadcast (one-to-many), the headend station also has complete control of the downstream transmissions as well.

Various protocols are becoming available for controlling the transmission of upstream data and requests. Of primary interest is the formation of the IEEE 802.14 working group, which has been formed with the responsibility of standardizing the medium access control (MAC) layer protocols for HFC networks. The MAC level access protocol (MLAP) is a MAC-level protocol for the HFC environment that has been formally submitted to the IEEE 802.14 working group for consideration. MLAP is the protocol used by the present invention and is described in more detail hereinafter.

The prior art deals with management techniques and systems that control the contention between a number of devices sharing a bi-directional digital network, so that all the devices can access the shared media.

In U.S. Pat. No. 5,634,485, "Media Access Control for Digital Data," by Buckland, et al., Buckland teaches a method for controlling the contention for use of a digital network between a broadband network headend unit and network devices. Each device contributes a portion of an upstream signal to the broadband network headend unit. The upstream signal comprises a series of frame intervals. A frame interval has two major components: request slot packets and cell slot packets. Request slot packets are allocated one for each device. There is an arbitrary number of cell slot packets. The request slot packets transmit requests for cell slots to the broadband network headend unit. The broadband network headend unit decodes the requests, determines which to grant, and responds to the requesting device with a downstream signal that identifies which cell slots are allocated to the device. Buckland teaches a protocol for use over cable TV and similar networks that is similar to the MLAP protocol used by the present invention. However, Buckland's protocol applies only to fiber-to-the-curb (FTTC) network topology and is a unique protocol that is different than the MLAP protocol used by the present invention to hybrid fiber-coaxial (HFC) networks. FTTC topology provides the fiber network much closer to each customer premise than HFC does and allows a separate coaxial cable to be run to each premise. On the other hand, the HFC topology is more standard and more difficult to deal with, since the cables are run a greater distances and each coaxial handles the traffic to and from many premises sharing the same coaxial cable. Thus, the HFC topology generates contention by all users for the use of the coaxial cable and requires a more sophisticated protocol. In addition, Buckland does not use special-purpose hardware to assist in the implementation of his protocol as the present invention does.

In U.S. Pat. No. 5,353,285, "Time Slot Management System," by Van Der Plas et al., Van Der Plas teaches another system for controlling the sending of upstream data from various stations to a headend station. The substations send data as packets during time slots as assigned by the headend station. Part of the time slots are reserved for management information and used by the substation to inform the headend station about the bandwidth required to transfer upstream information. Accordingly, the headend station allocates time slots and informs the substations thereof. This is very similar to the request slot packets and cell slot packets taught by Buckland in U.S. Pat. No. 5,634,485 and discussed previously. Van Der Plas does not teach the MLAP approach and does not use special-purpose hardware to assist in the implementation of his protocol as does the present invention.

In U.S. Pat. No. 5,572,517, "Configurable Hybrid Medium Access Control for Cable Metropolitan Area Networks," by Sadadi, Sadadi teaches yet another media access control (MAC) system having unique characteristics. Sadadi combines four of the popular MAC concepts into a system which is configurable to the type of communication required to support a desired service or application. The MAC system analyzes the services requested from each premise or client and determines the best MAC concept to use from four supported candidates, including plain old polling (POP) to three different versions of time division multiplexing. Sadadi does not use the MLAP format used by the present invention, nor does he use special-purpose hardware to assist in the implementation of his protocol as is done by the present invention.

In U.S. Pat. No. 5,541,921, "Isochronous Serial Time Division Multiplexer," by Swenson et al., Swenson teaches a method and controller for filling time slots of a plurality of serial data streams by multiplexing time slots from a plurality of incoming isochronous serial data streams. Swenson uses a plurality of selectors where each selects predetermined time slots from a plurality of incoming data streams to create the plurality of outgoing serial data streams. Swenson uses a time slot method but only teaches unidirectional data flow and has no further relation to the bi-directional data flow of the present invention.

In U.S. Pat. No. 5,365,514, "Event Driven Interface for a System for Monitoring and Controlling a Data Communications Network," by Hershey et al., Hershey teaches an apparatus for performing vector calculations. Hershey's invention receives control vectors from the system processor. The control vectors are comprised of binary patterns of 1s and 0s. Hershey's apparatus stores a plurality of control vectors and searches the data patterns :on incoming serial data for the detection of identical matches between the control vectors and incoming data patterns. The matches (compare equal occurrences) are counted and generate event vectors back to the processor to inform it of the number of occurrences with respect to each control vector. Hershey's invention is used as a subsystem for monitoring and controlling data communication networks where the data communication networks are serial in nature and provide the incoming data patterns to be compared against the control vectors. Based on the occurrence of data patterns over the data communication networks, the processor can reroute data from congested networks to other optional networks. The present invention uses a vector control mechanism that is different than Hershey's in that it is a complete vector array functional unit capable of a plurality of functions including bit setting, bit resetting, bit masking, bit muxing, bit manipulation, priority encoding, and nth index generation. The present invention performs all of these functions on parallel data, never receives incoming serial data, and never looks for pattern comparisons as Hershey's invention does. The present invention does not use vectors to control network routings but instead uses vector calculations to control upstream traffic over interactive cable TV media.

In U.S. Pat. No. 5,226,079, "Non-Repudiation in Computer Networks," by Holloway, Holloway teaches the supplementing of conventional message authentication methods by using an authentication token, known as the "Non-Repudiation Vector"(NRV). The token is used to provide very strong evidence of the origin of a electronic message. The NRV cryptographically links each message sent or received by a particular data processor on the network to create a chain of cryptographically linked messages. However, Holloway uses the term "vector" to mean a data structure comprised of a plurality of bytes, wherein the vector identifies the originator of the message, a token which binds the message to previous and subsequent messages, and an authenticator which cryptographically binds the NRV to the associated message. This is vastly different than the present invention which uses the term "bit vector" to mean a bit that represents a data structure and discloses a bit array unit for performing logical operations on the bit vectors.

In U.S. Pat. No. 5,384,777, "Adaptive Medium Access Control Scheme for Wireless LAN," by Ahmadi et al., Ahmadi teaches yet another system for controlling the sending of upstream data from various stations to a headend station. Ahmadi's patent, however, relates to wireless radio transmissions instead of cable TV. Ahmadi's approach uses time slots and is very similar to the request slot packets and cell slot packets taught by Buckland in U.S. Pat. No. 5,634,485 and discussed previously. Ahmadi teaches a new concept of variable length time slots; however, the present invention does not use Ahmadi's wireless LAN or variable length time slots.

In U.S. Pat. No. 5,568,485, "Priority Encoder," by Chaisemartin, Chaisemartin teaches a circular rank priority encoder that receives a plurality of requests of ranks 1 to n on each request. The encoder acknowledges the request of the lowest rank. The encoder also comprises a mask register to enable only the consideration of active ranks for each request. A mask generator provides the mask generator with a mask in which bits of the ranks 1 to x (x=1 to n) are inactive and the remaining bits are active when a request of rank x is acknowledged. The present invention incorporates a priority encoder for processing bit vectors, but it performs a different function than Chaisemartin's approach. The priority encoder of the present invention does not accept rank request but instead receives a vector comprised of y bits with each bit having a specific location within the vector and each bit being either a 1 or 0. From the vector input, the priority encoder processes the vector and returns the binary encoded number which indicates the position within the vector of the first occurrence of a logical "1". Neither does the present invention use Chaisemartin's mask register or mask generator approaches.

It is an object of this invention to provide an efficient mechanism for subscriber tabulation of available upstream slots using an intermediate data structure associated with each upstream slot.

It is a further object of this invention to provide a compact representation of each intermediate data structure defining an upstream slot by representing each intermediate data structure with a single bit vector element.

It is a further object of this invention to provide a mechanism in the form of a bit vector array functional unit for efficient processing and selection of upstream slots using only the bit vector representation of the upstream slot data.

It is a further object of this invention to provide flexibility in the bit vector array functional unit for selecting either contention or reserved slots and for performing a plurality of pertinent calculations on the bit vector representation of the upstream slot data.

SUMMARY OF THE INVENTION

In accordance with the invention, a bit vector array functional unit is provided for efficiently tabulating available upstream slots for selection and transmission of either requests for service or data transfer. The preferred use of the bit vector array functional unit is for the medium access control (MAC) for cable TV transmissions where a single headend station sends TV programs, requested movies or information downstream to a plurality of subscriber stations, and each subscriber station sends requests and data transfers to the headend station as upstream traffic. The headend station controls the contention amongst the upstream requests by assigning upstream slots for use by the subscribers. Each subscriber station contributes a portion of an upstream signal to the broadband network headend unit.

The upstream signal comprises a series of frame intervals. A frame interval has two major components: contention slots and reserved slots. The reserved slots are allocated for use to a particular subscriber. The contention slots transmit requests for reserved slots to the broadband network headend station. The broadband network headend station decodes the requests, determines which to grant, and responds to the requesting subscriber station with a downstream signal that identifies which reserved slots are allocated to the subscriber station. The communication of the upstream requests and data requires a protocol for controlling the communications between the headend station and the subscriber stations. The disclosed invention uses the MAC level access protocol (MLAP) which has been formally submitted as a candidate for a standard protocol.

The bit vector array functional unit is used at each subscriber station in conjunction with a conventional data processor for the processing and selection of upstream slots as directed by the headend station. The bit vector array functional unit is directly linked to the data processor in much the same manner that an Arithmetic and Logic Unit (ALU) is to the processor complex. The data processor analyzes communications received from the headend station and constructs intermediate data structures to tabulate the upstream slot information received from the headend station. Each intermediate data structure is represented by a bit vector element in each of several bit vectors. The bit vector is processed in the bit vector array functional unit quickly and efficiently. The bit vector array functional unit performs functions based upon instructions provided by the processor. Like other functional units, the bit vector array functional unit is comprised, of local hardware registers and combinational logic for manipulating the hardware registers. The hardware registers are used to store 32-bit vectors where the bits in the vector each represent an upstream slot of a particular type.

The advantages of this invention will become apparent from the following detailed description of the presently preferred embodiment of the invention, taken in conjunction with the accompanying drawings.

BRIEF DESCRIPTION OF THE DRAWINGS

FIG. 4 shows a timing diagram showing the timing relationships between the upstream and the downstream transmissions of reserved slots according to the preferred embodiment of this invention.

FIG. 5 shows the content of the basic slot control message providing slot allocation data according to the preferred embodiment of this invention.

DETAILED DESCRIPTION OF A PREFERRED EMBODIMENT OF THE INVENTION

The IEEE 802.14 working group has been formed with the responsibility of standardizing physical (PHY) layer and medium access control (MAC) layer protocols for HFC networks. The MAC level access protocol (MLAP) is a MAC-level protocol for the HFC environment that has been formally submitted to the IEEE 802.14 working group for consideration. MLAP operates on a full-duplex, multichannel, shared-media network consisting of a variable number of stations or subscribers spread over several kilometers and a single headend controller located several tens of kilometers away from the stations. MLAP is a flexible "asynchronous transfer mode (ATM)-friendly" protocol that supports quality of service (QoS) constraints for various classes of traffic. It allows for contention-based and reservation-based transmissions which are dynamically adjusted to the traffic conditions and has provisions to operate over several modulation techniques. MLAP is supported by a management protocol that provides (among other things) for a ranging and joining process in order to dynamically add newly powered-on stations in a "plug-and-play" manner.

Figure 1:
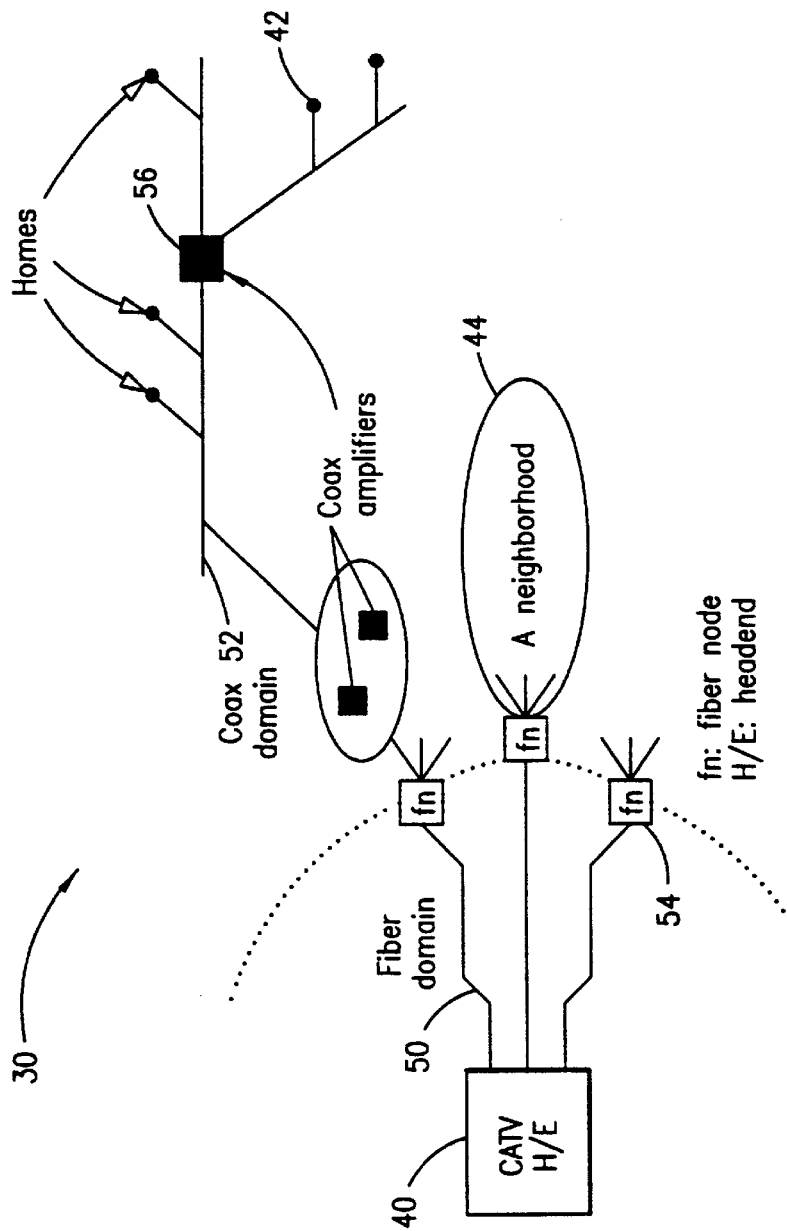
FIG. 1 is a diagram showing the topology of the standard cable TV network according to the prior art.

The first key feature of MLAP is the HFC network model. Referring to FIG. 1, the CATV network topology 30 is summarized. The topology 30 is a collection of tree and branches with the root of the tree located at the CATV headend station 40 (or simply the headend) and the leaves at people's homes or subscriber stations 42 (or simply stations). In an HFC network 30, there are two domains identified:

(1) The fiber domain 50, which extends from the headend 40 to the subscriber's neighborhood 44, containing anywhere from 500 to 2000 homes; and (2) The coaxial domain 52, which covers the "last mile (s)" distribution network to the subscriber stations 42.

The distance from the headend 40 to the farthest home 42 is about 80 km, with the homes located only at about the last 20 percent (or less) of this distance.

Historically, the whole CATV (distribution) network 30 only comprised coaxial cables. The advantages of fiber cable, such as reduced signal attenuation, a smaller number of signal amplifiers required, resistance to electromagnetic interferences, and larger bandwidth have "encouraged" many cable operators to upgrade their plants from plain coaxial cable to hybrid fiber/coaxial cable. The fiber nodes 54 at the edges of the fiber and coaxial domains are responsible for converting optical signals to electrical for downstream transmissions and vice versa for upstream transmissions. Also, since traditionally CATV transmissions have been broadcast from the headend 40 to all the stations 42, the amplifiers 56 on the network 30 were one-directional as well. Bidirectional transmissions on the HFC network will require the upgrade of the one-directional signal amplifiers 56 to bidirectional. This is not as burdensome as it sounds, because an HFC network uses a substantially lower number of signal amplifiers (relative to a just coaxial network), and cable operators can add the bidirectional amplifiers at the same time they upgrade their plants to HFC.

Figure 2:
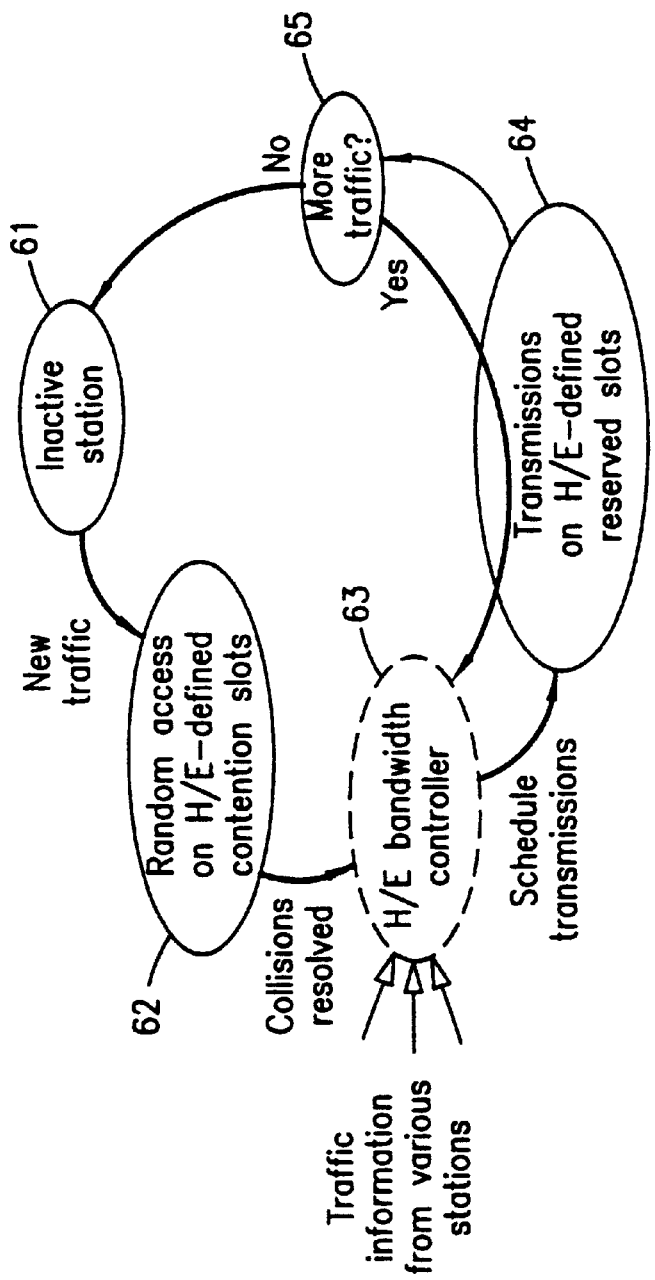
FIG. 2 is a diagram showing the phases of operation of medium access control (MAC) for the preferred protocol of controlling upstream transmissions according to the preferred embodiment of this invention.

The second key feature of MLAP is the MLAP protocol. MLAP was developed to take advantage of the "peculiarities" of the HFC network 30 in an efficient, flexible, and robust manner. The basic philosophy behind MLAP is summarized in FIG. 2. Inactive stations 61 (i.e., stations with nothing to transmit) need not do anything. When new traffic is generated in a station 42, the station 42 attempts to notify the headend 40 of its new traffic through the use of a random access mechanism 62. For this reason, the headend 40 periodically notifies all the stations 42, through transmissions on the downstream channel, of time intervals during which contention-based transmissions can occur on an upstream channel. When collisions are successfully resolved and traffic information reaches the headend 40, a bandwidth controller 63 at the headend 40 schedules future transmissions from the stations 42. In order for the network 30 to support an abundance of services, the traffic scheduler 63 at the headend 40 is guided by QoS constraints. Once again, stations 42 are notified on the downstream of time intervals during which prescheduled reservation-based transmissions 64 can occur. Since the transmission time intervals on the upstream channel are under the total control of the headend 40, contention-based transmissions 62 and reservation-based transmissions 64 do not interfere with each other. Finally, if an active station 42 generates additional traffic during the period of its reservation-based transmissions 64, the station can use the (collision-free) reservation-based transmissions 64 to convey to the headend 40 information regarding the additional traffic 65.

MLAP provides enough information to the scheduling algorithm at the headend 40 that it can schedule transmissions as flexibly as possible. The MLAP protocol is a blocked protocol in that the downstream and upstream channels are delineated by constant time intervals, hereafter called blocks. A block duration must be longer than the worst case round-trip delay of the network 30, including all delays (such as propagation, headend 40, and station 42 processing times). A block duration must be established by the network operator as a headend-controller parameter, and it is typically a few milliseconds long. Blocks are further divided into variable-size time slices called slots, which are the transmission time intervals of the previous section. Each slot contains a message, hereafter referred to as a primitive. During initialization, each station 42 goes through a ranging process to adjust its upstream block 72 in such a way that the upstream blocks from all stations 42 are exactly aligned when they reach the headend 40.

Figure 3:
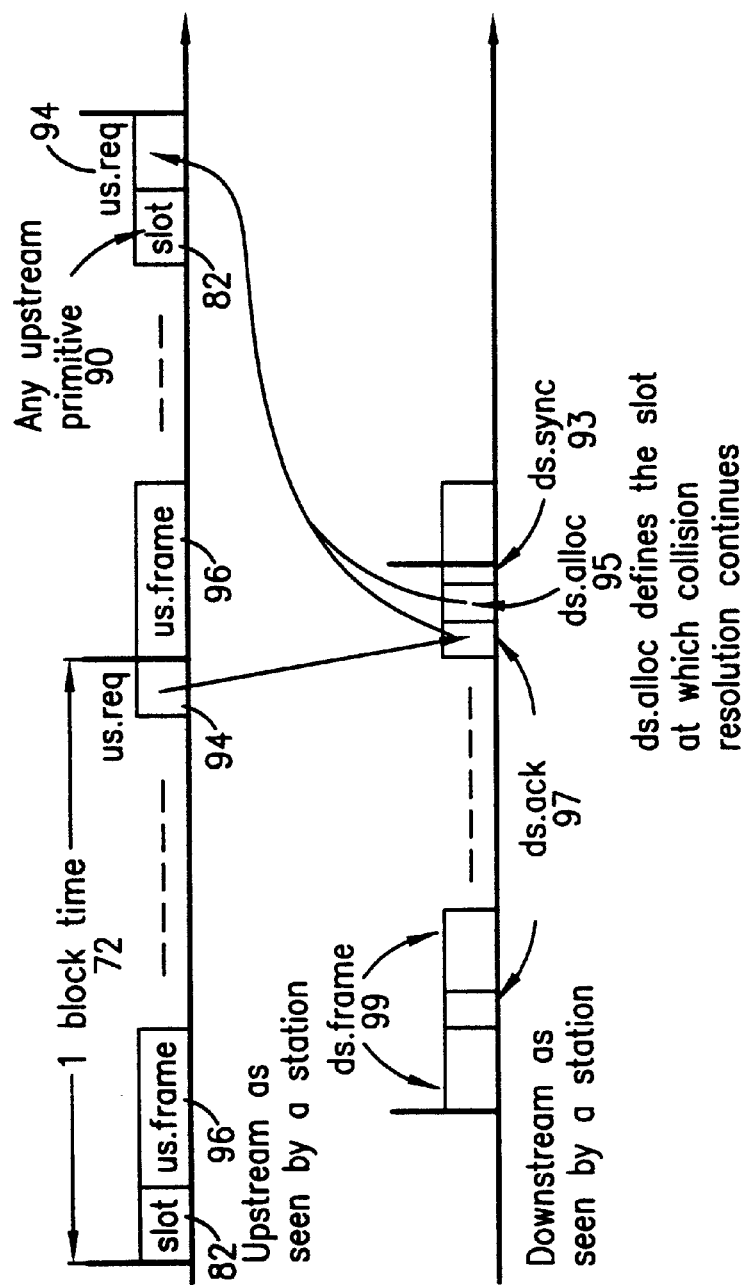
FIG. 3 is a timing diagram showing the timing relationships between the upstream and the downstream transmissions of contention slots according to the preferred embodiment of this invention.

Referring to FIGS. 3 and 4, examples of the use of primitives are shown. The MLAP primitives are types of messages transmitted either downstream or upstream. The various types of primitives are as follows:

DS.SYNC 93 enables each station 42 to maintain synchronization with the start of the downstream block 71.

DS.ALLOC 95 carries upstream slot 82 allocations, that is, defines contention slots 86 and reservation slots 88. The entire upstream block format 72 is determined solely by DS.ALLOCs 95.

US.REQ 94 carries an upstream bandwidth request.

DS.ACK 97 carries the results of contention-mode transmission 62 attempts.

US.FRAME 96 carries payload(s) 101 (data or MAC management control information) and requests 105 for additional upstream transmission bandwidth 64.

DS.FRAME 99 carries a payload 100 (data or MAC management control information).

FIG. 3 shows how contention-based transmissions using US.REQs 94 are coordinated with the help of DS.ACK 97 and DS.ALLOC 95 primitives. For example, initially a station 42 sends bandwidth request information to the headend 40 on a US.REQ 94 primitive which has been previously defined by a DS.ALLOC 95 primitive; this corresponds to block 62 in FIG. 2.

Observing the DS.ACK 97 primitives following its transmission, the station 42 learns whether its transmission has collided or not. If it has, the station 42 executes a (given) random access algorithm and takes an appropriate action by the time the corresponding US.REQ 94 appears in the next block 72. Assuming a successful (contention-based) transmission, FIG. 4, on the other hand, shows how a chain of collision-free, reservation-based transmissions can extend over several blocks 70 with the use of the request bandwidth (RB) subfield 105 in a US.FRAME 96 primitive. In particular, during a transmission in a reserved US.FRAME 96, which has once again been previously defined by a DS.ALLOC 95, a station 42 can notify the headend 40 that it has more traffic pending. The headend 40 uses this information to schedule more traffic from the station 42 on collision-free US.FRAMES 96; this corresponds to the cycle of phase transitions shown as block 65 in FIG. 2.

Headend Control of Contention Slots and Reserved Slots

Referring to FIG. 5, a more detailed diagram of the DS.ALLOC 95 primitive is shown. The DS.ALLOC 95 primitives are comprised of fields 111 to 118. Each DS.ALLOC 95 primitive defines one slot 82 in the next upstream block 72, and each slot 82 can carry one upstream primitive 92. The DS.ALLOC 95 primitive contains all of the information necessary to control where in the upstream block 72 the slot 82 is located, which stations may access the slot, and the mode (contention 86 or reservation 88) in which the slot 82 is to be used. Each DS.ALLOC 95 primitive begins with the DS.ALLOC identifier 111 and is protected by the Cyclic Redundancy Check (CRC) field 118. The following additional information is contained in each DS.ALLOC 95 primitive:

Source Address 112—Field 112 specifies the station or group of stations 42 that may access the specified upstream slot 82.

Offset 113—Field 113 specifies, in units of $\frac{1}{1024}$ th, the starting point of the specified upstream slot 82. The value of zero specifies that the slot 82 begins at the start of upstream block 72.

Probability 114—Field 114 specifies the probability with which all newly activated stations 42 will transmit in the specified upstream slot 82, if it is a contention slot 86. There are four probability values ranging from 0 to 100 percent.

Frequency Field 115—Field 115 specifies the frequency to be used for transmitting in the specified upstream slot 82.

PHY Control Field 116—Field 116 specifies the modulation rate, modulation type, and preamble type of the specified upstream slot 82.

Grant Field 117—Field 117 specifies the number of payloads 100 that may be sent in the specified upstream slot 82. If the slot is a contention slot 86, then field 117 contains a contention identification number correlated with the DS.ACK 97 primitive that is sent to indicate the collision status of the contention slot 86.

The DS.ALLOC 95 primitives are sent by headend station 40 to the stations 42 where they are used to control all upstream traffic 72. The upstream traffic 72 is comprised of two major components: contention slots 86 and reserved slots 88. The reserved slots 88 are allocated for use to a particular station 42. The contention slots 86 transmit requests for reserved slots 88 to the broadband network headend 40 unit. A plurality of contention slots 86 for each upstream block 72 are defined by DS.ALLOC 95 primitives sent by each downstream block 71. An example of this can be seen in FIG. 4, where the contention slots for upstream block 72, 122 are defined by DS.ALLOC 95 primitives sent during downstream block 71, 121. A plurality of DS.ALLOC 95 primitives are sent by each downstream block 71, and each defines an available contention slot 86 that can be used during the subsequent upstream block 72. Each station 42 must decide which of the plurality of contention slots to use for each of the requests that it has pending to be sent to the headend 40. If a station 42 selects to use a specific contention slot 86, which is not selected by any other station 42, its request is transmitted successfully to headend 40, because it does not collide with any other request being transmitted in the same contention slot 86 by any other station 42. However, if two stations 42 select the same contention slot 86, their requests overlay each other and garbled data arrives at the headend station 40. The headend 40 detects the garbled data and determines that contention slot 86 is not carrying any valid requests 94. Thus, it is important for the various stations 42 to try to select contention slots that will not be used by any other station 42. The various stations 42 cannot directly listen to the upstream transmissions 72 from other stations 42. Hence, stations 42 are incapable of detecting collisions and ultimately coordinating their transmissions all by themselves. The headend station 40 plays the major role in coordinating the access to the upstream transmissions 72, by acknowledging affirmatively (via DS.ACK 97) the non-garbled requests 94 that it receives. The headend 40 unit decodes the requests, determines which to grant, and responds to the requesting station 42 with a downstream signal in the form of a DS.ALLOC 95 primitive that identifies which reserved slots 88 are allocated to a particular station 42.

Station Selection of Contention Slots

It is the function of each station 42 having requests 94 to transmit upstream to select a contention slot 86 from the plurality of available contention slots 86 as defined by DS.ALLOC 95 primitives sent during the previous downstream block 71. Each station 42 processes the DS.ALLOC 95 primitives as they arrive to determine if the station 42 can use them, and if so tabulates the available contention slots 86 from which it has to choose. When the downstream block 71 is complete each station contains a pool of available contention slots 86 to choose from during the next upstream transmission 72. If station 42 needs to make a request 94 and no reserved slots are available to provide the RB 105 field, the station 42 randomly selects a slot 86 from the pool of available contention slots 86. The problem for each station 42 becomes selecting a slot 86 that will not be chosen by any other station 42, so that it can transmit its request 94 uninhibited. Probability field 114 of DS.ALLOC 95 indicates the likelihood that the station 42 will be allowed to use the contention slot 86 as defined by the DS.ALLOC 95. Multiple stations 42 can be vying to use each contention slot 86. Probability field 114 helps to distribute the contention of a plurality of stations 42 wanting to send requests 94 across the available contention slots. It provides an additional factor to help station 42 select a random slot 86 so to attain a better probability of not experiencing collision.

Figure 6:
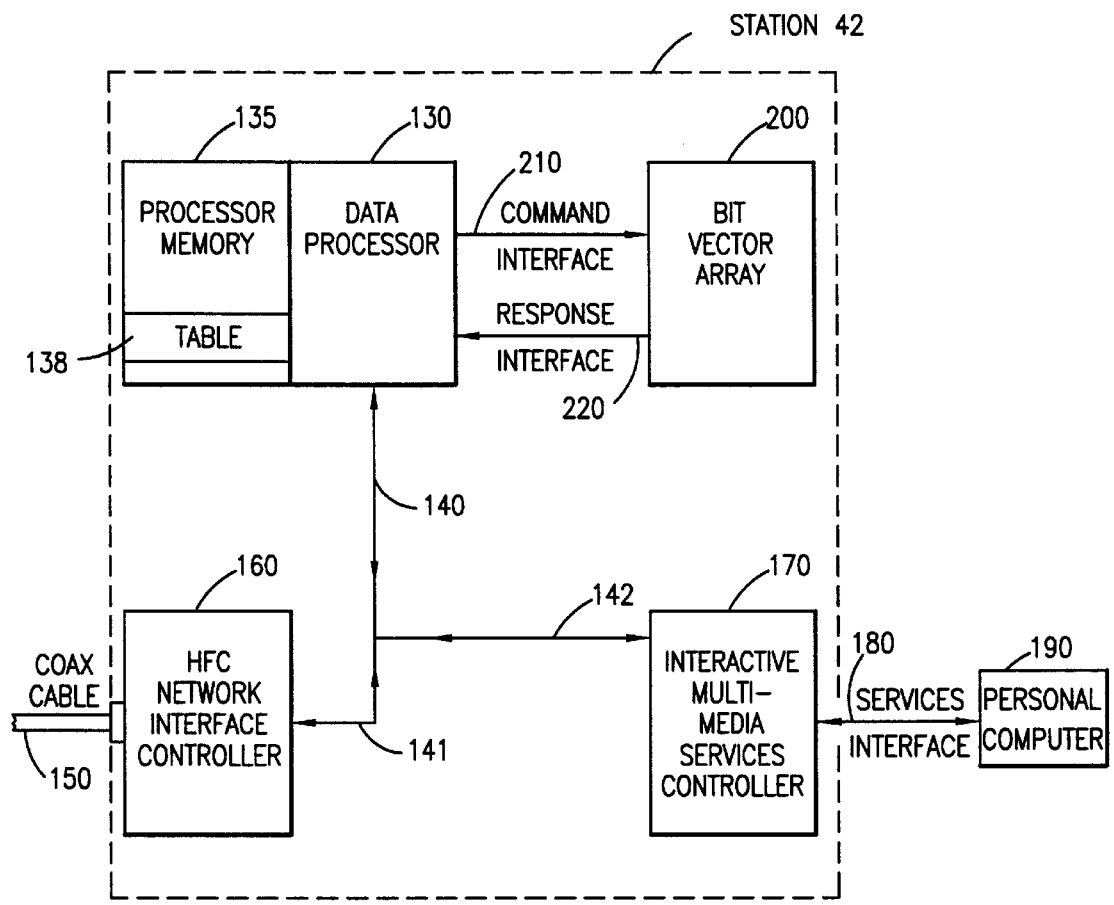
FIG. 6 is a diagram showing the major hardware composition of the subscriber station according to the preferred embodiment of this invention.

Referring to FIG. 6, the bit vector array functional unit 200 is used at each station 42 in conjunction with a conventional data processor 130 for the processing and selection of upstream slots 82 as directed by the headend station 40. A typical station 42 is comprised of processor 130 and processor memory 135 to provide the control functions performed by station 42; bit vector array functional unit 200 to provide a special-purpose functional unit to assist in controlling slot selection and other MLAP protocol functions; HFC Network Interface Controller 160 to interface station 42 to the cable TV network arriving from coaxial cable 150; and Interactive Multi Media Services Controller 170 to interface station 42 to external devices, like personal computer 190, over Services Interface 180. Both the HFC Network Interface Controller 160 and the Interactive Multi Media Services Controller 170 communicate to processor 130 over the processor Input/Output Bus 140, which is comprised of branch 141 connecting to the HFC Network Interface Controller 160 and branch 142 connecting to the Interactive Multi Media Services Controller 170. The processor sends commands to Bit Vector Array 200 over command interface 210, and processor 130 receives responses back from Bit Vector Array 200 over response interface 220.

Figure 7:
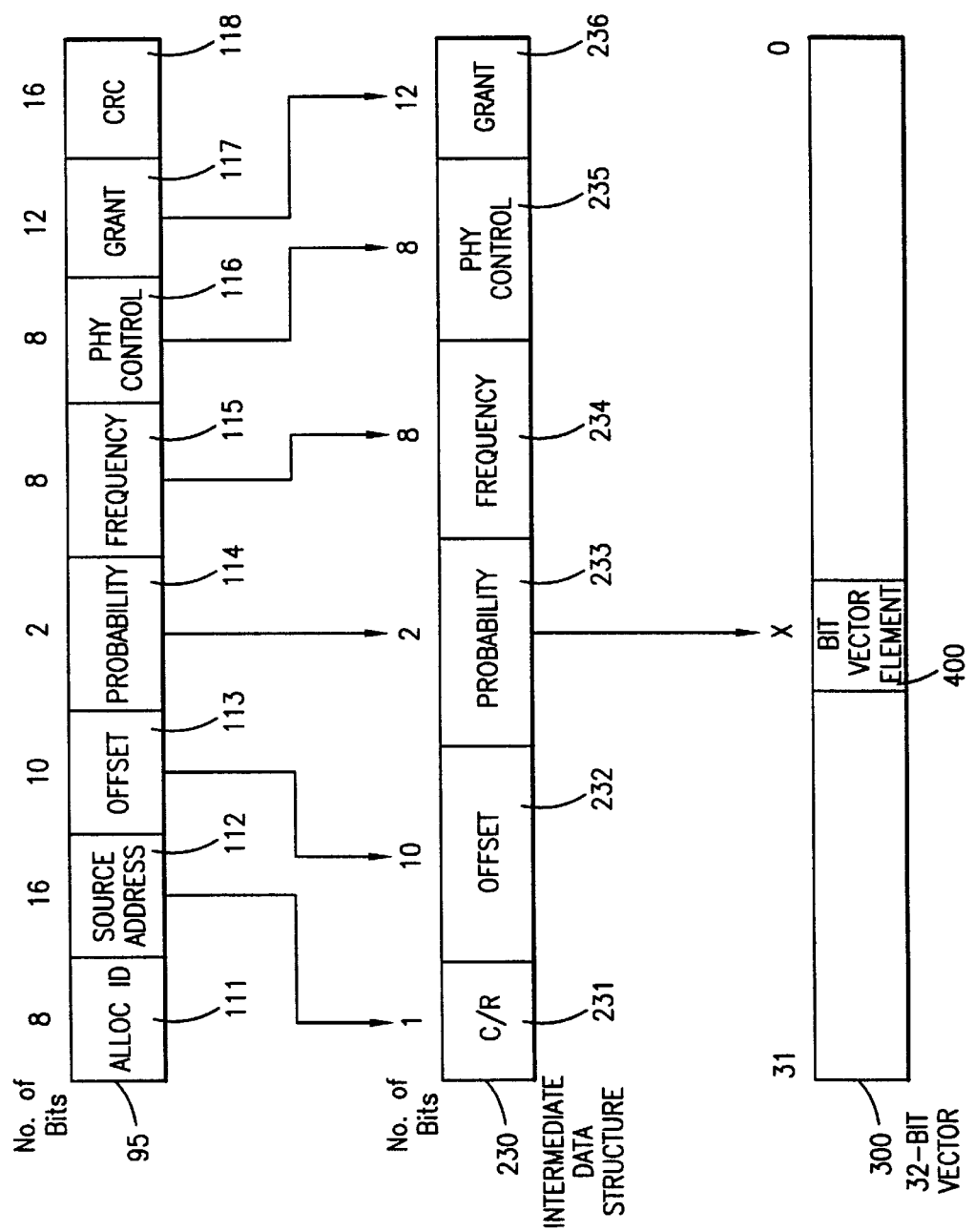
FIG. 7 is a flow chart of the data conversion operation for reducing slot allocation data to intermediate data structures and representing intermediate data structures with bit vector elements according to the preferred embodiment of this invention.

The bit vector array functional unit 200 is directly linked to the data processor 130 in much the same manner that a standard Arithmetic and Logic Unit (ALU) is linked to the processor complex. Referring to FIG. 7, a data flow diagram is shown depicting how processor 130 changes a DS.ALLOC 95 primitive arriving at station 42 over coaxial cable 150. The DS.ALLOC 95 primitive is transferred to processor 130 over busses 140 and 141 after being recovered and converted to parallel format by HFC Network Interface Controller 160. The data processor 130 analyzes DS.ALLOC 95 communications received from the headend 40 and constructs intermediate data structures 230 to tabulate the upstream slot information that has been received from the headend 40. Processor 130 constructs the intermediate data structure 230 by executing the following steps:

1) Checking CRC field 118 of DS.ALLOC 95 primitive to verify that the DS.ALLOC 95 primitive arrived without error, and then destroying CRC field 118.

2) Checking identification field 111 to determine the primitive is a DS.ALLOC 95, and then destroying identification field 111.

3) Checking source address field 112 to determine if the DS.ALLOC 95 primitive is defining a contention slot 86 or a reserved slot 88, then setting the Contention/Reserved (C/R) Field 231 in the intermediate data structure 230 to the appropriate state and destroying the source address field 112.

4) The remaining fields 113 to 117 are incorporated unchanged into the intermediate data structure 230 as corresponding fields 232 to 236.

After extracting data and converting DS.ALLOC 95 primitives to an intermediate format 230, processor 130 stores the intermediate structure 2.30 into table 138 in processor memory 135 for further processing at a later time. A plurality of DS.ALLOC 95 primitives will arrive at station 42 at various times throughout the downstream block 71. Processor 130 creates the intermediate data structure 230 for each primitive 95 as it arrives and stores each intermediate data structure 230 to a different location in table 138 in processor memory 135. The upstream slots 82 defined by these DS.ALLOC 95 primitives that are converted into intermediate data structures 230 fall into one or more categories, such as contention slots 86 and reserved slots 88.

Processor 130 selects slots from the appropriate category following the end of the downstream block 71 and before the beginning of the next upstream block 72. However, scanning the intermediate structures 230 each time processor 130 is making a slot selection would be a lengthy process. Instead, a far more efficient method is used to scan the data one time to classify slots 82 and keep the results in summary form; i.e., to use a bit vector element 400 to represent each intermediate structure 230. As shown in FIG. 7, the DS.ALLOC 95 primitive is converted to intermediate structure 230, and then the intermediate structure 230 is represented by a single bit vector element 400. Bit vector element 400 is stored to the 32-bit bit vector 300 where the position of bit vector element 400 within bit vector 300 corresponds to the position of the corresponding entry of intermediate structure 230 into table 138. For instance, if the intermediate structure 230 is stored as the ninth table 138 entry, then the corresponding bit vector element 400 would be stored in bit number 9 of bit vector 300.

Bit vectors 300 are stored to the bit vector array functional unit 200, which is a special-purpose functional unit to assist processor 130 in controlling slot selection. The bit vectors 300 are processed in bit vector functional unit 200 quickly and efficiently. The bit vector array functional unit 200 performs functions based upon instructions provided by the processor 130.

Figure 8:
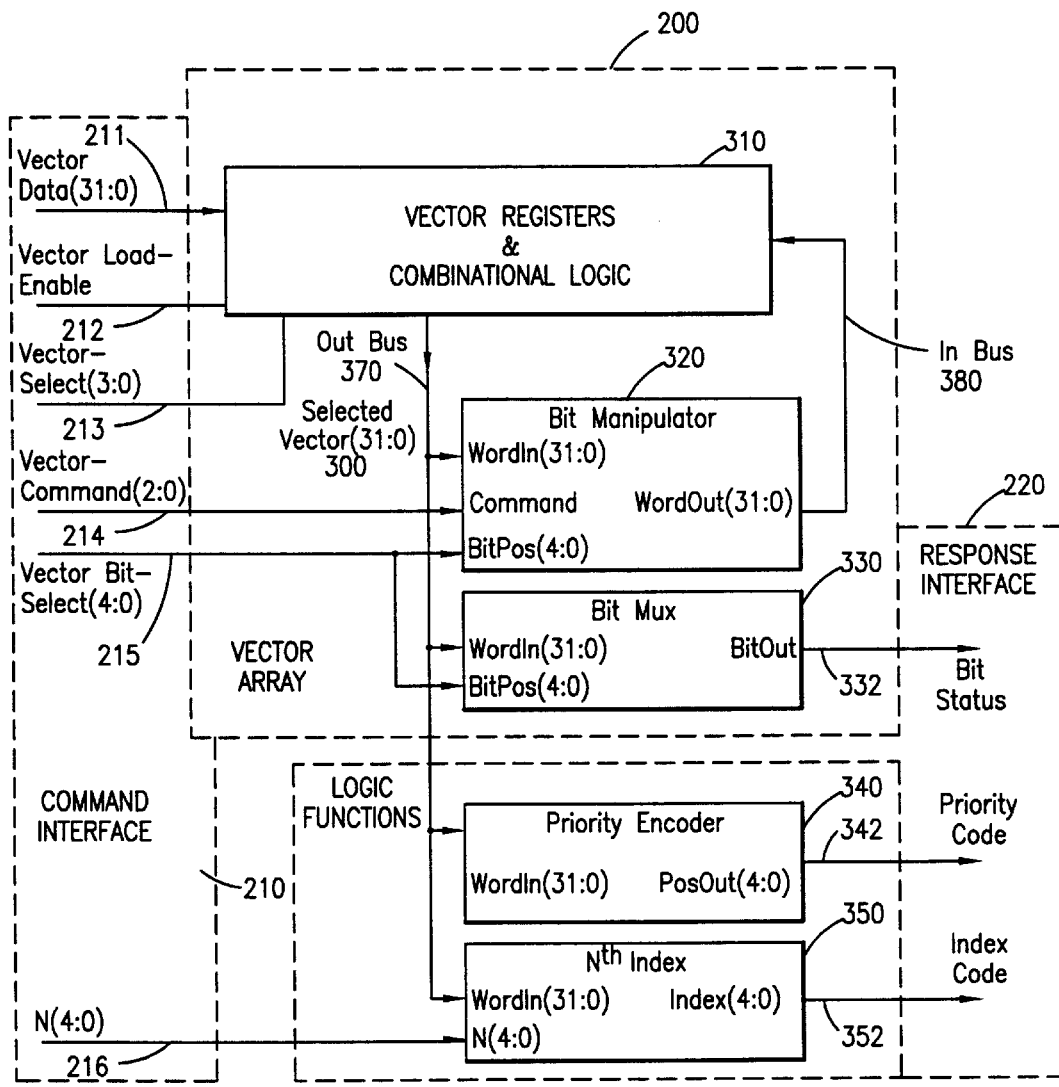
FIG. 8 is a block diagram showing the composition of the bit vector functional unit, which is a hardware unit for assisting in slot selection according to the preferred embodiment of this invention.

Referring to FIG. 8, a block diagram of bit vector array functional unit 200 is shown. The bit vector array functional unit 200 is comprised of vector registers and combinational logic 310 which store and perform logical operations on the bit vectors 300. In addition, bit vector array functional unit 200 contains other specialized functions including bit manipulator 320, bit multiplexer (mux) 330, priority encoder 340, and Nth index logic 350. Processor 130 communicates to bit vector array functional unit 200 over command interface 210, and processor 130 receives data from bit vector array functional unit 200 over response interface 220.

Figure 9:
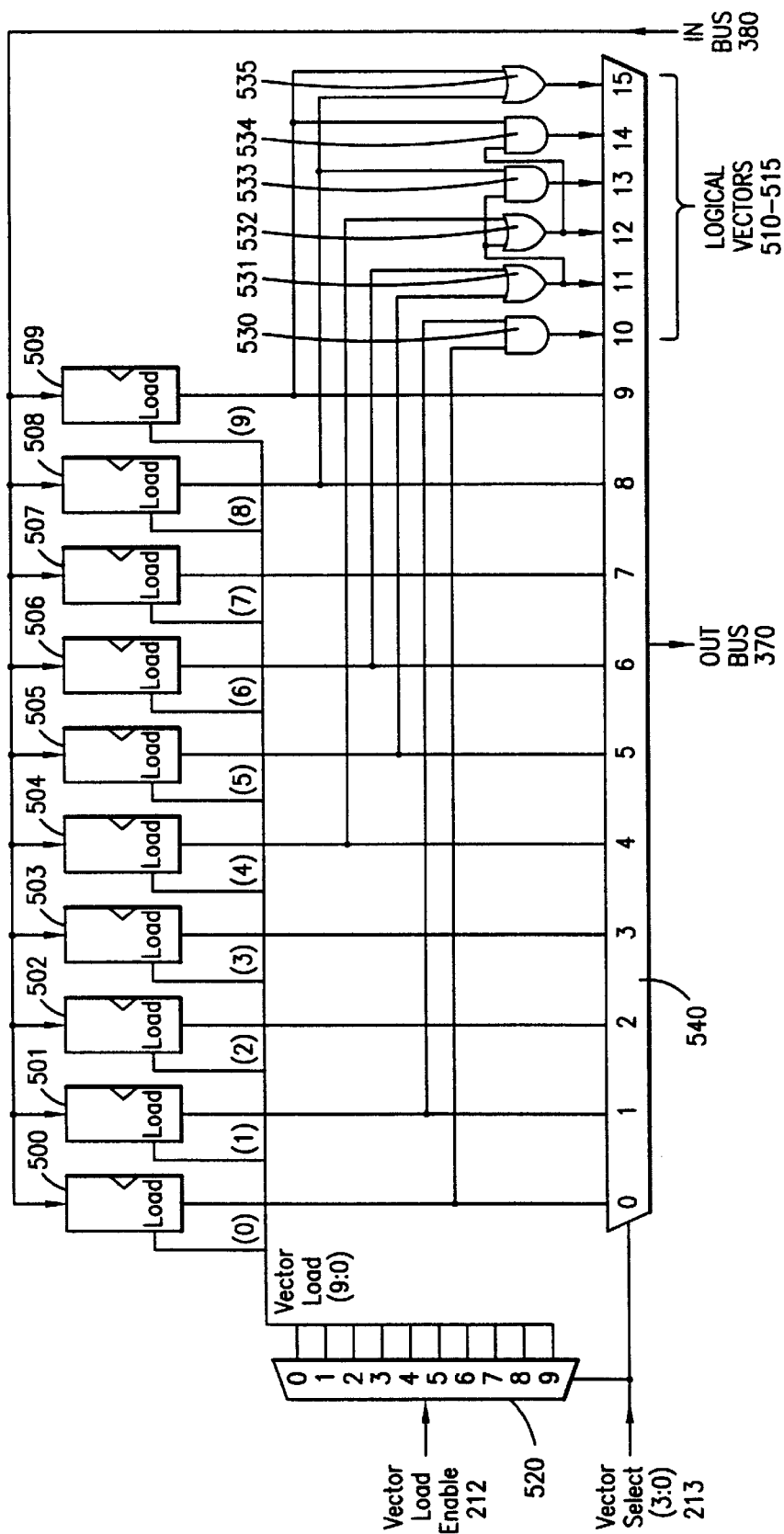
FIG. 9 is a block diagram showing the composition of the vector registers and combinational logic, which is a major hardware section of the bit vector functional unit according to the preferred embodiment of this invention.

Referring to FIG. 9, further detail of vector registers and combinational logic 310 is shown. Vector registers and combinational logic 310 is comprised of ten 32-bit vectors registers 500 to 509, each for storing one bit vector 300; logic gates 530 to 535 to perform logical operations on certain ones of the vector registers 504, 505, 506, 508, 509; multiplexer 540 to select 1 of 16 vectors comprised of ten vector registers 500 to 509 plus six logical vectors 510 to 515, the selected bit vector 300 to be output to outbus 370; and selector 520 to select one of the vector registers 500 to 509 for loading from inbus 380.

The hardware registers 500 to 509 are used to store 32-bit bit vectors 300 where a vector uses 1 bit to represent each available upstream slot of a particular type. The logical vectors 510 to 515 have the following values:

VECTOR 510=VECTOR 500 AND VECTOR 501
VECTOR 511=VECTOR 505 OR VECTOR 506
VECTOR 512=VECTOR 504 OR VECTOR 505 OR VECTOR 506
VECTOR 513=(VECTOR 505 OR VECTOR 506) AND VECTOR 508
VECTOR 514=(VECTOR 504 OR VECTOR 505 OR VECTOR 506) AND VECTOR 509
VECTOR 515=VECTOR 508 OR VECTOR 509

FIG. 9 shows the vector bit storage and the logic 530 to 535 associated with a typical bit of the 32-bit bit vector 300.

FIG. 9 is repeated 32 times to provide ten vector registers 500 to 509 that are 32 bits deep and six logical vectors 510 to 515 that are also 32 bits deep. Likewise, outbus 370 and inbus 380 are 32-bit busses which transmit 32-bit bit vectors 300 from and to block 310.

Command Interface 210 (shown in FIG. 8) provides a means for selecting any vector register 500 to 509 or any logical vector 510 to 515 to outbus 370. From outbus 370 a bit vector 300 can be further processed by bit manipulator 320, bit multiplexer (mux) 330, priority encoder 340, or Nth index logic 350. The vector select inputs 213 are 4 coded bits used to select one of the 16 vectors 500 to 515. The vector select inputs 213 control mux 540, commanding mux 540 to select one of sixteen 32-bit bit vectors 300 to forward to outbus 370. The Vector Load Enable signal 212 provides a load signal to the selected vector register 500 to 509 for storing a modified bit vector 300 after being modified by bit manipulator 320 and returned over inbus 380. The vector select inputs 213 are used by decoder 520 along with Vector Load Enable signal 212 to select the specific vector register 500 to 509 to be loaded.

Each bit in bit vector 300 corresponds to a specific slot 82 position with the upstream slot structure. Typically, if the upstream slot 82 positions within upstream block 72 are numbered sequentially 0 to 31, then the corresponding slot 82 position within vector word 300 also is numbered 0 to 31.

A typical example of how bit vector functional unit 200 is used for slot processing assumes the DS.ALLOC 95 primitives and the slots they represent to fall into one of three categories, reserved (R), contention 1 (C1), and contention 2 (C2). If the DS.ALLOC 95 for slot 3 corresponded to type R, then bit position 3 of vector register 504 would be set to "1" assuming that vector register 504 was selected as the bit vector 300 to be used to track reserved slots 88. The use of each vector register 500 to 509 is selected under software control by the software program driving processor 130. If the DS.ALLOC 95 for slot 3 corresponded to type C1, then bit position 3 of vector register 505 would be set to 1, assuming that vector register 505 was selected as the bit vector 300 to be used to track category 1 of contention slots 86. Likewise, if the DS.ALLOC 95 for slot 3 corresponded to type C2, then bit position 3 of vector register 506 would be set to 1, assuming that vector register 506 was selected as the bit vector 300 to be used to track category 2 of contention slots 86. Then logical vector 511 would indicate slots of types C1 or C2, while logical vector 512 would indicate slots of types C1, C1, or R. In another example each bit in vector register 500 represents a request for service from Interactive Multi Media Services Controller 170 (shown in FIG. 6), and vector register 501 is used as a mask for the requests. Logical vector 510 is the logical AND of vector registers 500 and 501 and indicates the result of masking the service requests.

Bit manipulator 320, under control of command interface 210, can set a single bit or all of the bits of the selected 32-bit vector word 300 that it receives over outbus 370 to either "1s" or "0s". Vector command 214 controls the operation performed by bit manipulator 320 by commanding that either single bits or all bits be set to either "0s" or "1s". Vector bit select 215 provides 5 control bits to bit manipulator 320 to command which of the 32 bits of bit vector 300 is to be altered for single operations. The altered bit vector is returned for storage into a specific vector register 500 to 509 over inbus 380.

Bit multiplexor 330, under control of command interface 210, can select a single bit from the selected 32-bit bit vector 300 that it receives over outbus 370. Vector bit select 215 also provides 5 control bits to bit multiplexor 330, and determines which one of the 32 bits in vector word 300 is to be selected. The selected bit is output on bit status line 332 to response interface 220. Response interface 220 provides status and results to processor 130 of operations performed in the bit vector functional unit 200.

Priority encoder 340 accepts the 32-bit bit vector 300 that it receives over outbus 370 and determines the index of the first occurrence of a bit position set to "1" of vector word 300 starting from bit 0. The index is the binary encoding of the lowest numbered bit position being set to "1". The index comprised of 5 bits is output on priority code lines 342 to response interface 220. One use of priority encoder 340 relates to when logical vector 510 represents the masked service requests as described hereinbefore. In this case the priority code 342 is the number of the highest priority service request. Processor 130 responds to the highest priority request and clears the mask bit in vector register 501 corresponding to the service request being processed. Processor 130 can then command priority encoder 340 to determine the next highest priority service request.

Nth index function 350 will return the index of the Nth occurrence of a bit being "1" in the selected bit vector 300 starting at bit 0. For instance, if N=5, then Nth index function 350 will determine the number of the bit position in vector word 300 that contains the 5th occurrence of the binary value "1". The N control lines 216 provide 5 control bits from command interface 210 to determine the value of N for each calculation. The number of the bit position containing the Nth occurrence is binary coded into index code 352 and output to response interface 220. The Nth index function 350 is used for selecting upstream slots 82. Since the bit positions in bit vector 300 each correspond to an intermediate data structure 230 in table 138 of processor memory 135, a bit vector 300 for tabulating contention slots 86 would have a logical "1" in each bit position that corresponds to an available contention slot 86. If N=6 was commanded over N lines 216, then the Nth index function 350 determines the index 352 of the 6th available contention slot 86 and also points to the corresponding intermediate data structure 230 in table 138 for the 6th available slot 86. Once a slot has been selected for use, bit manipulator 320 is used to set the corresponding bit in the contention slot bit vector 300 to "0" so that the slot will not be selected on subsequent application of the Nth index function 350.

Processor 130 selects slots 82 from the appropriate category following the end of the downstream block 71 and before the beginning of the next upstream block 72. The intermediate data structure 230 associated with the selected slots must be retrieved from table 138, while the data associated with the used slots must be discarded from table 138. Processor 130 retrieves the relevant intermediate data structure 230 in the correct slot order for upstream transmission by merging both contention slots 86 and reserved slots 88 for transmission in the correct time sequential order.

The advantage of this invention is that complex data structures are represented and processed in the simplest possible form as single bits. This approach provides a high speed method and apparatus for media access control.

It is a further advantage of this invention that an efficient mechanism for subscriber tabulation of available upstream slots is provided using a bit vector array functional unit for efficient processing and selection of upstream slots based on the bit vector representation of the upstream slot data.

It will be appreciated that although the specific embodiment of the invention has been described herein for purposes of illustration, various modifications including the use of different and additional bit processing functions or bit vector lengths may be made without departing from the spirit and scope of the invention.

Accordingly, the scope of protection of this invention is limited only by the following claims and their equivalents.

What is claimed is:

1. A bit vector array apparatus for enhancing the performance of a control processor by providing special-purpose processing functions for a plurality of data structures, wherein each data structure is represented by a unique single bit referred to as a bit vector element, said bit vector array apparatus comprising:

a processor memory means for storing instructions, data, and tables for said control processor;

an assembly means for assembling a plurality of said bit vector elements into a composite bit vector;

a plurality of vector registers, each vector register for temporarily storing one said bit vector;

a plurality of combinational means, wherein each combinational means combines two or more said vector registers using logical AND/OR type functions to generate a logical vector which is derived from the said two or more vector registers;

a plurality of bit processing functional units for performing bit-by-bit operations on said vector registers and said logical vectors; and a selection means for routing any of said vector registers or said logical vectors to said plurality of bit processing functional units.

2. The bit vector array apparatus of claim 1, further comprising a command interface from said control processor for the purpose of commanding and controlling said vector registers, said logical vectors, and said bit processing functional units.

3. The bit vector array apparatus of claim 2, further comprising a response interface to said control processor for the purpose of monitoring the results of processing operations performed by said bit processing functional units.

4. The bit vector array apparatus of claim 2, wherein said command interface provides vector selection control lines to control said selection means for routing any of said vector registers or said logical vectors to said plurality of bit processing functional units.

5. The bit vector array apparatus of claim 3, wherein the bit processing functional units further comprise a bit manipulator unit for changing a single bit or all bits in said bit vector to either zero(es) or one(s).

6. A bit vector array apparatus for enhancing the performance of a control processor by providing special-purpose processing functions for a plurality of data structures, wherein each data structure is represented by a unique single bit referred to as a bit vector element, said bit vector array apparatus comprising:

a processor memory means for storing instructions, data, and tables for said control processor;

an assembly means for assembling a plurality of said bit vector elements into a composite bit vector;

a plurality of vector registers, each vector register for temporarily storing one said bit vector;

a plurality of combinational means, wherein each combinational means combines two or more said vector registers using logical AND/OR type functions to generate a logical vector which is derived from the said two or more vector registers;

a plurality of bit processing functional units for performing bit-by-bit operations on said vector registers and said logical vectors;

a selection means for routing any of said vector registers or said logical vectors to said plurality of bit processing functional units;

a command interface from said control processor for the purpose of commanding and controlling said vector registers, said logical vectors, and said bit processing functional units; and a response interface to said control processor for the purpose of monitoring the results of processing operations performed by said bit processing functional units;

wherein the bit processing functional units further comprise a bit manipulator unit for changing a single bit or all bits in said bit vector to either zero(es) or one(s), and wherein the bit processing functional units further comprise a bit multiplexer unit for selecting a single bit from said bit vector and routing the status of the selected bit to said control processor over said response interface.

7. The bit vector array apparatus of claim 6 wherein the bit processing function units further comprise a priority encoder for generating a first binary code from the first occurrence of a bit position set to "1" within said bit vector, and routing said first binary code to said processor over said response interface.

8. The bit vector array apparatus of claim 7, wherein the bit processing functional units further comprise an Nth index unit for determining a number corresponding to the bit position containing the Nth occurrence of a bit being set to "1", where N is a positive integer between 0 and 31.

9. The bit vector array apparatus of claim 8, wherein the Nth index unit further comprises a binary encoder for encoding said number corresponding to bit position containing the Nth occurrence into a second binary code for routing to said control processor over said response interface.

10. The bit vector array apparatus of claim 9, wherein the Nth index unit further comprises a set of command lines for defining the value of said N by said control processor over said command interface.

11. The bit vector array apparatus of claim 10, wherein the command interface further comprises a second set of command lines for defining the binary coding of the bit to be manipulated by said bit manipulator unit, or for defining the bit to be selected by said bit multiplexer, wherein said second set of command lines are driven by said control processor over said command interface.

12. An apparatus including:

a plurality of vector registers, each one being operable to store a vector comprising of at least one bit;

a plurality of combinational logic circuits, wherein each combinational logic circuit combines two or more said vector registers using logical AND/OR type functions to generate a logical vector which is derived from the said two or more vector registers;

a plurality of bit processing functional units for performing bit-by-bit operations on said vector registers and said logical vectors; and a selection circuit for routing any of said vector registers or said logical vectors to said plurality of bit processing functional units.

13. The apparatus of claim 12 further including a command interface that controls said vector registers, said logical vectors and said bit processing functional units.

14. A bit vector array apparatus for enhancing the performance of a control processor by providing special-purpose processing functions for a plurality of data structures, wherein each data structure is represented by a unique single bit referred to as a bit vector element, said bit vector array apparatus comprising:

a processor memory means for storing instructions, data, and tables for said control processor;

an assembly means for assembling a plurality of said bit vector elements into a composite bit vector;

a plurality of vector registers, each vector register for temporarily storing one said bit vector;

a plurality of combinational means, wherein each combinational means combines two or more said vector registers using logical AND/OR type functions to generate a logical vector which is derived from the said two or more vector registers;

a plurality of bit processing functional units for performing bit-by-bit operations on said vector registers and said logical vectors; and a selection means for routing any of said vector registers or said logical vectors to said plurality of bit processing functional units;

wherein the plurality of bit processing functional units includes a bit manipulator, a bit MUX, priority encoder and Nth index logic function.

15. The apparatus of claim 13 further including a processor that generates signals to activate the command interface.

16. Apparatus comprising:

a control processor which provides special-purpose processing functions for a plurality of data structures, wherein each data structure is represented by a unique single bit referred to as a bit vector element;

a processor memory means for storing instructions, data, and tables for said control processor;

an assembly means for assembling a plurality of said bit vector elements into a composite bit vector;

a plurality of vector registers, each vector register for temporarily storing one such bit vector element;

a plurality of combinational means, wherein each combinational means combines two or more said vector registers using logical AND/OR type functions to generate a logical vector which is derived from the said two or more vector registers;

a plurality of bit processing functional units for performing bit-by-bit operations on said vector registers and said logical vectors; and a selection means for routing any of said vector registers and said logical vectors to said plurality of bit processing functional units.

17. Apparatus of claim 16, further comprising a command interface from said control processor for the purpose of commanding and controlling said vector registers, said logical vectors, and said bit processing functional units.

18. Apparatus of claim 17, further comprising a response interface to said control processor for the purpose of monitoring the results of processing operations performed by said bit processing functional units.

19. Apparatus of claim 17, wherein said command interface provides vector selection control lines to control said selection means for routing any of said vector registers or said logical vectors to said plurality of bit processing functional units.

20. Apparatus of claim 18, wherein the bit processing functional units further comprise a bit manipulator unit for changing a single bit or all bits in said bit vector to either zero(es) or one(s).

21. Apparatus comprising:

a control processor which provides special-purpose processing functions for a plurality of data structures, wherein each data structure is represented by a unique single bit referred to as a bit vector element;

a plurality of vector registers, each one being operable to store a vector comprising at least one such bit vector element;

a plurality of combinational logic circuits, wherein each combinational logic circuit combines two or more of said vector registers using logical AND/OR type functions and generates a logical vector which is derived from two or more of said plurality of vector registers, wherein each of said plurality of vector registers and the logical vector(s) is directly addressable by said control processor;

a plurality of bit processing functional units for performing bit-by-bit operations on said vector registers and said logical vectors; and a selection circuit for routing any of said vector registers and said logical vectors to said plurality of bit processing functional units.

22. Apparatus of claim 21 further comprising a command interface that controls said vector registers, said logical vectors and said bit processing functional units.

23. Apparatus of claim 22 further wherein said control processor generates signals to activate the command interface.

\* \* \* \* \*